Patented Mar. 24, 1931

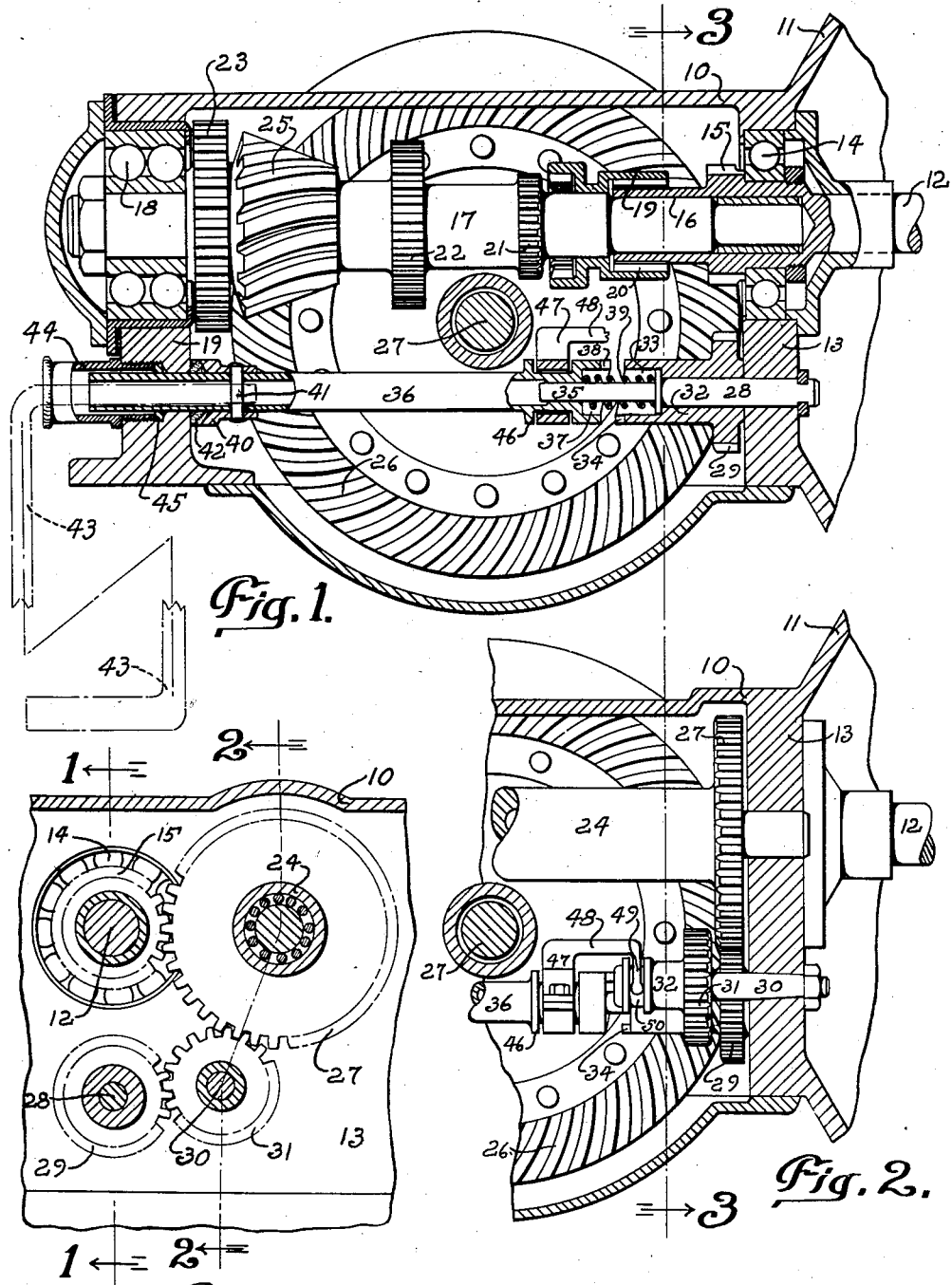

1,797,577

UNITED STATES PATENT OFFICE

ROSCOE C. HOFFMAN, OF DETROIT, MICHIGAN

MOTOR VEHICLE

Application filed September 4, 1928. Serial No. 303,632.

This invention relates to motor vehicles, and particularly to motor vehicles provided with a so-called "front wheel drive" in which the transmission is placed forwardly of the engine, the principal object being the provision of a new and novel means for manually cranking the engine from the front end of the vehicle.

Another object is to provide means for manually cranking the engine of a front wheel drive motor vehicle which will permit the crank handle to be turned in a clockwise direction as in the case of the conventional rear wheel drive motor vehicles.

Another object is to provide a mechanism for manually turning over the engine of a motor vehicle including manually operable means co-operating with the transmission thereof.

Another object is to provide means for manually cranking the engine of a motor vehicle including a manually rotatable gear co-operating with the constant mesh gears of the vehicle transmission.

Another object is to provide manual cranking means for a motor vehicle co-operating with the transmission thereof and including a shiftable gear element.

A further object is to provide manual cranking means for a motor vehicle including a dog clutch and a shiftable gear, the dog clutch and the gear being simultaneously put into operative position upon a single movement of the starting crank.

The above being among the objects of the present invention, the same consists in certain features of construction and combinations of parts to be hereinafter described with reference to the accompanying drawing, and then claimed, having the above and other objects in view.

In the accompanying drawing which represents a suitable embodiment of the present invention and in which like numerals refer to like parts throughout the several different views,—

Fig. 1 is a vertical sectional view taken through the transmission of a front wheel drive motor vehicle centrally of the main transmission shaft thereof as on the line 1—1 of Fig. 3.

Fig. 2 is a fragmentary vertical sectional view of the transmission shown in Fig. 1 through the axis of the countershaft as on the line 2—2 of Fig. 3.

Fig. 3 is a fragmentary vertical sectional view taken as on the line 3—3 of Figs. 1 and 2.

The provision of means for manually cranking the engine of a front wheel drive motor vehicle has presented a number of difficulties, particularly where the transmission is placed forwardly of the engine, and it is the principal object of the present invention to provide a simple and economical mechanism to accomplish this result. The particular construction of the transmission mechanism shown in the accompanying drawing and to which the present invention is shown applied is the subject of my application for United States Letters Patent for improvements in power transmission mechanism filed February 24th, 1928 and serially numbered 256,538, although it is to be understood that the present invention is not limited in its application to the particular transmission mechanism shown but may be equally well applied to any suitable type of transmission mechanism employed for front wheel drives, and further may, in some instances, be desirable for application to motor vehicles other than front wheel drive motor vehicles.

The transmission mechanism itself is more fully shown and described in my previous patent application above referred to and briefly comprises a transmission housing 10 provided at the rear with a bell housing 11 which is adapted to be secured to the clutch housing (not shown) formed on or as a part of the front end of the crank case of the internal combustion engine which serves as the source of power for the vehicle. The clutch driven shaft 12 is suitably mounted in the rear wall 13 of the transmission housing by suitable bearings 14 and has formed thereon immediately forwardly of the bearings 14 an external gear 15 which serves as one of the constant mesh gears of the transmission. The forward end of the clutch driven shaft 12 is provided with an internal opening 16 in which the rear end of the main transmission shaft 17 is rotatably received, the forward end of the shaft 17 being suitably supported in bearings 18 carried by the forward wall 19 of the transmission housing. The main transmission shaft 17 has splined thereto the sliding internal clutch member 19 which is adapted to engage the external clutch member 20 formed on the rear end of the clutch driven shaft 12 in order to directly connect the main transmission shaft 17 to the clutch driven shaft 12 for direct drive purposes when desired. The main transmission shaft has also formed thereon the clutch member 21 and the spur gears 22 and 23 which are adapted to engage suitable sliding gears (not shown) on the counter-shaft 24 in order to effect the various ratios of speed between the clutch driven shaft 12 and the main transmission shaft 17. The main transmission shaft is also provided with a bevel gear 25 which meshes with the ring gear 26 which is operatively connected to the axle shafts 27, as described in my previous application above referred to, the gears 25 and 26 being of the hypoid type which permits the transmission shaft 17 to be extended over the top of the axle shafts. The counter-shaft 24 is provided with a gear 27 secured thereto which meshes with the gear 15 and serves as the remaining constant mesh gear of the transmission. The gear 27 is thus in constant mesh with the gear 15 which is formed on the clutch driven shaft 12, and the clutch driven shaft 12 is directly connected to the engine at all times except when the clutch is in disengaged position.

In accordance with the present invention I provide a post 28 rigidly secured in the rear wall 13 of the transmission housing 10 below the transmission shaft 17 and in axially parallel relationship therewith, and rotatably supported against axial movement on the post 28 I provide a gear 29 lying in the same plane as the gears 15 and 27 but out of mesh with both of them. In the same wall 18 I provide a second post 30 extending forwardly therefrom and lying in axially parallel relationship with respect to the post 28 and transmission shaft 17, the post 30 being positioned in a plane perpendicular to a plane extending through the axes of the post 28 and the counter-shaft 24 and midway between the adjacent teeth of the gears 27 and 29. A gear 31 is rotatably and slidably mounted on the post 30 and is of such a diameter that when moved into the plane of the gear 27, meshes with both the gear 27 and the gear 29, but normally is out of meshing relationship with both. The gear 29 has formed thereon a forwardly extending hub portion 32 provided with an enlarged recess 33, and its forward edge is cut away as at 34 to form one member of an axially engageable dog clutch. The forward end of the post 28 is reduced in diameter as at 35 and rotatably supports thereon rear end of a tubular shaft 36 which is rotatably supported at its forward end in the forward wall 19 of the housing 10. The rear end of the shaft 36 is provided with an enlarged recess 37 and its rear edge is formed as at 38 to provide a dog clutch member adapted to co-operate with the dog clutch member 34 formed on the hub 32 of the gear 29. A coil spring 39 surrounding the reduced end 35 of the post 28 within the recesses 33 and 37 is held under compression between the bottoms of said recesses and normally urges the shaft 36 forwardly and the clutch members 34 and 38 out of engaged position. The shaft 36 is provided with a collar 40 secured thereto against axial and rotatable movement by a pin 41 extending through the same, suitable packing such as 42 being provided between the wall 19 and the collar 40 to prevent possible entrance of dirt or dust past the shaft 36 into the transmission housing 10 and serving to seal the shaft 36 in the wall 19 against the escape of lubricant from the transmission housing 10. The pin 41 also serves as a means for locking a starting crank such as 43 against rotation to the shaft 36 when it is desired to manually rotate the shaft 36, the end of the crank 31 being inserted into the hollow interior of the shaft 36 and having its end slotted so as to embrace the pin 41. A suitable guide thimble 44 may be provided in the wall 19 about the shaft 36, and packing such as 45 may be compressed about the shaft 36 at the end of the thimble 44 to further insure against escape of lubricant from the transmission housing 10 about the shaft 36.

The shaft 36 immediately forwardly of the dog clutch member at the rear thereof is provided with a circumferential groove 46, and rotatably received in the groove 46 and maintained therein against axial movement relative to the shaft 36 is the end of a shifter member 47 which is provided with an arm 48 terminating (see Fig. 2) in a yoke 49 engaged in a circumferential groove 50 formed on the forward end of the hub of the gear 31. The gear 31 is thereby constrained to equal axial movement with the shaft 36.

During normal operation of the vehicle the spring 39 holds the clutch members 34 and 38 in disengaged position by holding the shaft 36 at the forward limit of its axial movement, and at such time the shifter member 47 maintains the gear 31 forwardly of the plane of the gear 37 and consequently out of mesh therewith. When it is desired to manually crank the engine the transmission is placed in neutral position and the clutch in engaged position. The crank 43 is then inserted in the shaft 36 and pressure is applied to the shaft 36 through the crank 43 to move the shaft 36 rearwardly against the pressure of the spring 39 until the clutch members 34 and 38 engage each other. At the same time the shifter member 47 moves the gear 31 rearwardly into meshing relationship with both the gear 29 and 27. Thereafter, upon turning the crank 43 in a clockwise direction, the shaft 36 and gear 29 are caused to rotate in a clockwise direction turning the gear 31 in a counter-clockwise direction, the gear 27 in a clockwise direction, and the gear 15, and consequently the clutch driven shaft 12 in a counter-clockwise direction, this being the conventional direction of rotation of the crank shaft of an internal combustion engine driving a motor vehicle through the front wheels. Inasmuch as the clutch driven shaft 12 is directly connected to the crank shaft of the engine, at such time rotation of the crank 43 will accordingly cause rotation of the engine crank shaft. As soon as the engine begins to rotate under its own power, release of axial pressure on the crank 43 will permit the spring 39 to move the clutch members 34 and 38 out of engagement and move the gear 31 out of mesh with the gears 29 and 27.

It will be obvious that during normal running of the engine neither the gear 29 nor the gear 31 are rotated. This permits the simplest type of bearings to be employed for rotatably supporting the gears 29 and 31. It will also be apparent that although I have shown the gears 29, 31 and 15 as being of an equal diameter so as to get a one-to-one ratio between the starting crank 43 and the clutch driven shaft 12, the size of these gears may be changed to obtain any ratio between the starting crank and the crank shaft of the engine that is deemed desirable or necessary. As previously pointed out, although I have shown this manual cranking mechanism as applied to a transmission of a particular type for a front wheel drive motor vehicle, it will be obvious that it may be equally well adapted to any other type of transmission mechanism for motor vehicles with a front wheel drive or to those driving in the conventional manner through the rear wheels, the particular transmission shown being merely for the purpose of explanation.

Formal changes may be made in the specific embodiment of the invention described without departing from the spirit or substance of the broad invention, the scope of which is commensurate with the appended claims.

What I claim is:

1. In combination with the transmission of a motor vehicle and the constant mesh gears thereof, a manually rotatable axially shiftable shaft, a third gear co-operable with one of said constant mesh gears, and means for driving said third gear from said shaft, comprising an axially fixed member rotatable with said shaft.

2. In combination with the transmission of a motor vehicle and the constant mesh gears thereof, a manually rotatable axially shiftable shaft, and means for establishing a driving connection between said shaft and one of said gears upon shifting of said shaft to one extreme of its shiftable positions including a third gear shiftable with said shaft and by means for gearing said third gear to said shaft and to one of said constant mesh gears upon shifting of said shaft.

3. In combination with the transmission of a motor vehicle and the constant mesh gears thereof, an axially shiftable gear co-operable with one of said constant mesh gears and normally maintained out of engagement therewith, a manually rotatable axially shiftable shaft normally maintained out of driving engagement with said shiftable gear, means for shifting said axially shiftable gear upon axial shifting of said shaft, and means for driving said shiftable gear from said shaft upon axial shifting of said shaft.

4. In combination with the transmission of a motor vehicle and the constant mesh gears thereof, a manually rotatable axially shiftable shaft, a third gear axially shiftable with said shaft, a fourth gear, said third gear meshing with said fourth gear and one of said constant mesh gears when moved to one extremity of its shiftable positions, and means for establishing a driving connection between said shaft and said fourth gear.

5. In combination with the transmission of a motor vehicle and the constant mesh gears thereof, a third gear lying in the plane of said constant mesh gears, an axially shiftable manually rotatable shaft aligned with said third gear, means for clutching said shaft to said third gear upon axial movement of said shaft, and a fourth gear shiftable with said shaft into meshing relationship with said third gear and one of said constant mesh gears when said shaft is moved into clutching relationship with said third gear.

6. Means for manually cranking the engine of a motor vehicle characterized by the provision of a manually rotatable axially shiftable shaft and a pair of associated gears at least one of which is operatively connected to said shaft, both of said gears being normally rotatable relative to said shaft and to each other and one of said gears being axially shiftable into meshing relation with the other thereof, and means for locking one of said pair of gears to said shaft and placing said pair of gears in meshing relationship whereby to establish a driving connection between said shaft and said engine.

7. In combination, a transmission casing, a pair of constant mesh gears positioned in the rear end of said casing, an axially movable and rotatable shaft extending through the front wall of said casing and into adjacent relationship with respect to said constant mesh gears, and gear means movable by said shaft for establishing a driving connection between said shaft and one of said constant mesh gears.

8. In combination with the transmission of a motor vehicle and the constant mesh gears thereof, a manually rotatable axially shiftable shaft, a gear shiftable with said shaft, said gear normally being free to rotate relative to said shaft, and means for establishing a driving connection between said gear and both said shaft an one of said constant mesh gears upon axial movement of said shaft.

9. In combination with the transmission of a motor vehicle and the constant mesh gears thereof, an axially fixed rotatable gear, an axially shiftable and rotatable shaft, an axially movable gear, means for clutching said shaft to said axially gear upon axial movement of said shaft, and means dependent upon axial movement of said shaft for placing said axially movable gear in meshing relationship with said axially fixed gear and one of said constant mesh gears whereby to establish a driving relation between said shaft and said constant mesh gears.

10. In combination with the transmission of a motor vehicle including a casing and constant mesh gears housed therein at one end thereof, a manually rotatable axially shiftable shaft extending from adjacent said gears to the opposite end of said casing, an axially shiftable gear shiftable into meshing relationship with one of said constant mesh gears, means for establishing a driving engagement between said axially shiftable shaft and said axially shiftable gear upon axial shifting of said shaft, and means exterior to said other end of said casing for imparting axial and rotatable movement to said shaft.

11. In combination with the transmission for a motor vehicle and the constant mesh gears thereof, a manually rotatable axially shiftable shaft extending into said transmission in parallel relation with respect to the axes of said constant mesh gears, a pin supported in alignment with said shaft, a rotatable gear on said pin fixed against axial movement, co-operating clutch elements on said shaft and said gear co-operable upon axial shifting of said shaft to lock said shaft to said gear for rotation therewith, and means dependent upon said axial shifting of said gear for establishing a driving relation between said gear and one of said constant mesh gears.

ROSCOE C. HOFFMAN.